United States Patent [19]
Kurtz et al.

[11] Patent Number: 5,461,001
[45] Date of Patent: Oct. 24, 1995

[54] METHOD FOR MAKING SEMICONDUCTOR STRUCTURES HAVING ENVIRONMENTALLY ISOLATED ELEMENTS

[75] Inventors: Anthony D. Kurtz, Teaneck, N.J.; Joseph S. Shor, Flushing, N.Y.; Alexander A. Ned, Bloomingdale, N.J.

[73] Assignee: Kulite Semiconductor Products, Inc., Leonia, N.J.

[21] Appl. No.: 252,447

[22] Filed: Jun. 1, 1994

Related U.S. Application Data

[62] Division of Ser. No. 58,016, May 7, 1993, Pat. No. 5,386,142.

[51] Int. Cl.$^6$ .................................................. H01L 21/76
[52] U.S. Cl. .......................... 437/61; 437/901; 437/921; 437/927; 148/DIG. 12
[58] Field of Search .......................... 437/61, 901, 921, 437/927; 148/DIG. 12; 257/698

[56] References Cited

U.S. PATENT DOCUMENTS

| | | |
|---|---|---|
| 2,875,505 | 12/1952 | Pfann . |
| 3,761,782 | 9/1973 | Youmans .................... 437/927 |
| 3,900,811 | 8/1975 | Kurtz . |
| 4,406,993 | 9/1983 | Kurtz . |
| 4,437,109 | 3/1984 | Anthony et al. . |
| 4,773,972 | 9/1988 | Mikkor ...................... 148/DIG. 12 |
| 5,164,328 | 11/1992 | Dunn et al. ................... 437/927 |
| 5,166,773 | 11/1992 | Temple et al. . |

FOREIGN PATENT DOCUMENTS

| | | |
|---|---|---|
| 63-4731 | 3/1988 | Japan . |
| 1-94640 | 4/1989 | Japan . |

*Primary Examiner*—George Fourson
*Attorney, Agent, or Firm*—Plevy & Associates

[57] ABSTRACT

A first semiconductor wafer having a semiconductor element such as a piezoresistive element or any integrated circuit located on a top surface thereof is bonded to a second semiconductor wafer so that the semiconductor element on the first wafer is received in a cavity sealed from the outside environment. The bottom surface of the second wafer is prepared by etching it about a mask pattern so that the pattern projects from the bottom surface, thereby forming the cavity and defining projecting surfaces which are bonded to corresponding projecting areas on the first wafer to create a hermetic seal therebetween. The second wafer is electrochemically etched to produce porous silicon with regions of non-porous monocrystalline silicon extending between the top and bottom surfaces. The porous areas are thermally oxidized to convert them to silicon dioxide while the non-porous regions bonded to bond pads of the resistive pattern on the first wafer act as extended contacts.

12 Claims, 4 Drawing Sheets

METHOD FOR MAKING SEMICONDUCTOR STRUCTURES HAVING ENVIRONMENTALLY ISOLATED ELEMENTS

This is a Division of application Ser. No. 08/058,016, filed May 7, 1993 now U.S. Pat. No. 5,386,142.

BACKGROUND OF THE INVENTION

This invention relates to semiconductor devices generally, and more particularly, to a semiconductor structure having environmentally isolated circuit elements disposed thereon.

Integrated circuit devices generally comprise one or more circuit elements, such as P-N junction devices, MOS devices (diodes, transistors, etc.) and resistors, capacitors, and the like formed on or within a substrate. These devices, in particular, have found a multitude of applications in the field of electronics, ranging from rectification of electrical currents to amplification of electrical signals and many others. Such devices have also been used in the conversion of a mechanical or acoustical signal into an electrical signal, or vice versa.

Although semiconductor devices are extremely small, they possess high reliability and have been utilized in many applications where the external environment imposes difficult operating conditions on the semiconductor structure. For example, semiconductor transducers have been employed in aircraft, automobiles, and other vehicles in which the transducer is exposed to moisture, fuel, solvents, hydraulics, and the elements in general. Exposure to moisture and to airborne contaminants prevalent in the aforementioned environments can harm the piezoresistive elements employed in conventional transducers. Integrated circuit chips may also be exposed to the same environmental conditions and p-n junction devices utilized thereon are equally susceptible to damage from such operating conditions. However, it is well known that any of these devices should be enclosed in some sort of hermetic package for environmental protection.

Accordingly, many schemes have been devised for the protection of the circuit elements of integrated circuit chips and other semiconductor structures in harsh environmental conditions, but these are uneconomical, imperfect, and introduce various problems. One widely accepted method of providing protection to the piezoresistive elements of semiconductor pressure transducer, for example, is to utilize a metal isolation diaphragm coupling the pressure applied through a fluid transmitting medium. For one example of a device constructed in accordance with this approach, see U.S. Pat. No. 4,406,993 entitled OIL FILLED PRESSURE TRANSDUCERS, issued on Sep. 27, 1983 to Anthony D. Kurtz and assigned to the assignee herein. One problem associated with fluid encased configurations, however, is that the oil must be seated in an absolutely hermetic manner. Such a seal is difficult to obtain with a silicon chip. Another disadvantage is that the trapped oil expands at high temperatures, thereby causing an unwanted pressure signal. Accordingly, devices constructed in that manner are not suitable for the hot sections of aeronautical propulsion systems and other applications in which high temperature conditions exist.

In U.S. Pat. No. 3,900,811 entitled ECONOMICAL PRESSURE TRANSDUCER ASSEMBLIES, METHODS OF FABRICATING AND MOUNTING THE SAME, issued on Aug. 19, 1975 to Anthony D. Kurtz and assigned to the assignee herein, there is disclosed another technique for hermetically isolating a pressure transducer assembly in which the transducer chip is placed in a transistor housing assembly such as a TO-5 package. This is accommodated by ball bonding the contacts of the transducer to the posts of a Kovar base plate and capping it with a cylindrical Kovar header. A chief disadvantage of this technique, however, is that it requires the individual steps of ball bonding and hermetic packaging, which can not be performed as part of a batch process. There are of course a multitude of other hermetic headers or flat pack enclosures for assuring environmental protection. However, all involved separately mounting chips or dies within each enclosure, making individual electrical contacts from selected points on the chip or die to terminal pads on the enclosures and then individually sealing each enclosure.

It is therefore an object of the present invention to provide an environmentally isolated semiconductor structure which prevents contamination of the semiconductor elements disposed thereon. This invention seeks to provide a mechanical structure which is practical and economical for implementation in hermetically sealing the circuit elements disposed on or in any integrated circuit chip, thereby protecting such elements from environmental contamination. This sealing process is accomplished in wafer form so that a multiplicity of enclosures and lead connections are simultaneously made in a batch process.

SUMMARY OF THE INVENTION

A method of fabricating a hermetically sealed semiconductor structure comprises the steps of providing a first semiconductor wafer having a plurality of individual semiconductor circuits located on a surface thereof, providing a second semiconductor wafer which includes a plurality of dielectrically isolated, conductive single crystal regions or vias separated by regions of silicon dioxide and extending from one surface of the wafer to the other and separately dielectrically isolated rim structures each enclosing at least one of the conductive regions but being isolated therefrom, and bonding or joining the second semiconductor wafer to the first semiconductor wafer.

The bonding is done in such a way that each respective contact surface of the second wafer is coupled to a corresponding conductive pad of the first wafer and such that each cavity defined therebetween encloses one of the semiconductor circuits. Each semiconductor circuit is surrounded by at least one sidewall formed between the first and second semiconductor wafers.

Preferably, the second wafer is fabricated from a single crystal wafer by first preferentially masking the desired contact vias and the rim vias and converting the remaining material to porous silicon. After suitable oxidation, the porous material is converted to a continuous $SiO_2$, thereby dielectrically isolating the conductive single crystal vias and said rims, each from each other. This makes possible combining the separate steps of hermetically sealing and contacting within a batch process, thereby obviating the individual processes of ball bonding and separate packaging for hermetic seals heretofore required.

DETAILED DESCRIPTION OF THE INVENTION

Before proceeding with the detailed description, it should be understood that although the specification will make reference to a piezoresistive transducer in which piezoresistive elements are incorporated in a bridge configuration on a substrate, the inventive technique for hermetically sealing such elements thereon is not to be limited to transducer devices and is, in fact, applicable to other classes of semiconductor devices, such as integrated circuits generally as well as other structures utilizing circuit elements diffused or otherwise disposed on a semiconductor substrate.

Figure 1:
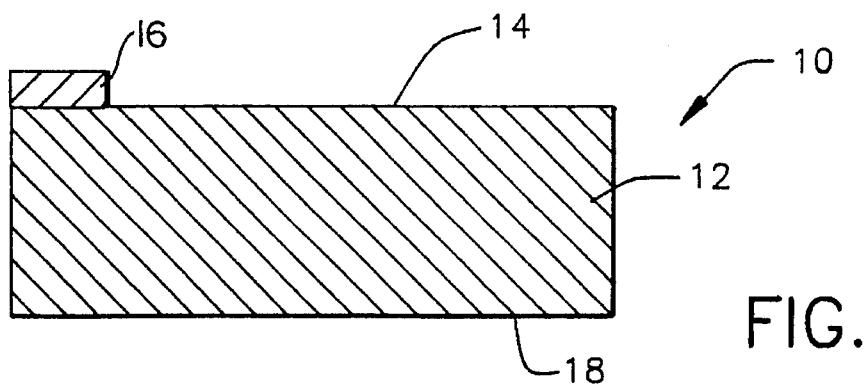
FIG. 1 is a cross sectional view of a semiconductor wafer used to fabricate the protective cover of the present invention.

In accordance with the present invention, a protective cover 10 comprised of both conductive and dielectric materials is formed which is adapted to be bonded to a surface of a semiconductor device so that electrical contact is maintained with electrical contacts thereon while the circuit elements associated therewith are hermetically sealed and isolated from the outside environment. As shown in FIG. 1, the protective cover 10 is conveniently formed from a 3.5 mil thick P-type wafer of low resistivity silicon 12, the back surface 14 of which is contacted by a conductive metal pad 16 which will form an ohmic contact. The conductivity type of the wafer 12 is selected to correspond to the electrical contact surfaces of a semiconductor structure having elements thereon which are to be environmentally isolated. Accordingly, while the illustrative wafer 12 is doped with p-type impurities, it is understood that it may also be doped n-type as required by the application. It is of course understood that with conventional IC techniques, semiconductor wafers greater than 3.5 mils thick are employed. Therefore, the wafer thickness is not critical.

Figure 2:
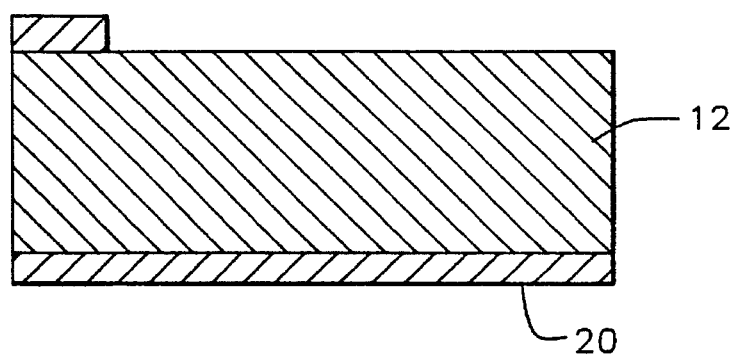
FIG. 2 is a cross sectional view depicting a step utilized to form the protective cover from the wafer illustrated in FIG. 1.
Figure 3:
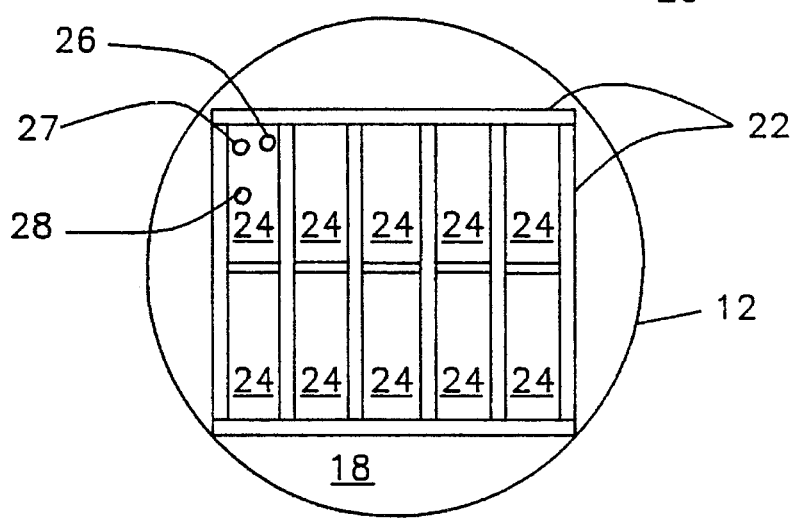
FIG. 3 is a top plan view showing a mask pattern utilized in accordance with one embodiment of the inventive method.
Figure 4:
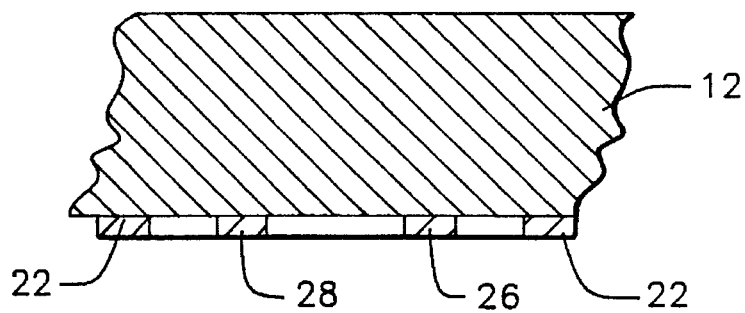
FIGS. 4–8 show a series of cross sectional views depicting a method of fabricating the protective cover of the present invention.

With reference now to FIG. 2, it can be seen that the front surface 18 of wafer 12 is treated or coated to form an etching mask layer 20 thereon. The mask layer 20 can be formed of silicon nitride and may be applied by any known method (e.g., by sputtering). A layer of photoresist (not shown) is then deposited on top of the mask layer. The layer of photoresist is patterned to form a resistive pattern over the mask layer 20. This is done by a conventional photolithography technique and is well known. A plan view of the resultant pattern is shown in FIG. 3 after etching the unwanted portions of the mask layer. For a purpose which will be explained later, the patterned portions of the mask layer comprise a grid of intersecting line portions 22 which define a plurality of rectangular areas 24. Within each rectangular area 24 are additional masked portions 26, 27 and 28 having a purpose which will be explained shortly.

Figure 5:
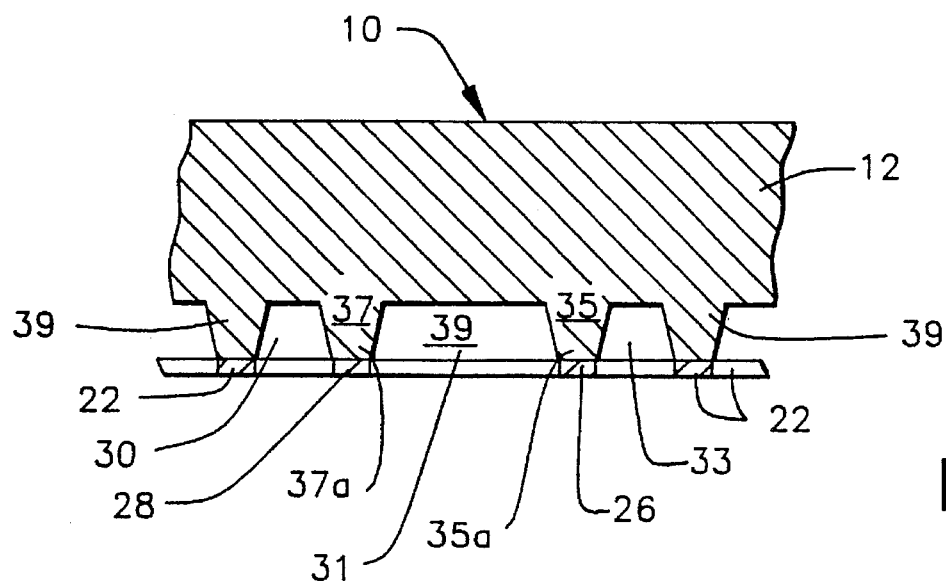

A cross sectional view of a portion of the wafer 12 showing one rectangular area 24 and the masked portions thereof is illustrated in FIGS. 4–8. It will, of course, be appreciated that the process steps discussed below are applicable to each rectangular area 24. As shown in FIG. 5, trenches 30, 31 and 33 are formed on the front surface 18. The location of central trench 31 is selected so that it may be aligned with circuit elements of a chip to be environmentally isolated, defining a hermetically sealable recess or cavity which receives the circuit elements. The positions of the remaining trenches determine the shape and location of contact projections 35 and 37, and a projecting rim portion 39 which circumscribes each rectangular area 24, each having a purpose which will be explained later. The trenches, which may be 5–10 μm deep or smaller or larger, can be formed by a conventional etching process using a selective etchant which will not attack the mask layer 20. For example, if silicon nitride is used to form the mask layer, potassium hydroxide may be utilized as the etchant since it will etch silicon without affecting silicon nitride. Once the pattern of trenches has been established, porous silicon regions are formed in the wafer 12. There is extensive literature in the prior art relating to the formation of porous silicon, and for this reason a detailed description of such processes has been omitted. A good reference is the article by R. L. Smith and S. D. Collins appearing in the Journal of Applied Physics, Volume 8, R1 (1992). In that reference, there is disclosed a porous silicon formation process utilizing electrochemical anodization. In such a process, the back surface 14 of the wafer 12 is coated with a suitable encapsulant such as black wax. The wafer 12 is then placed in an electrochemical cell containing an electrolytic solution such as dilute hydrofluoric acid (HF) and having a saturated calomel reference electrode and a platinum wire counterelectrode. The anodization time, applied potential, and pH are controlled in a conventional manner to obtain the desired porosity and pore morphology and to achieve the configuration shown in FIG. 6.

Figure 6:
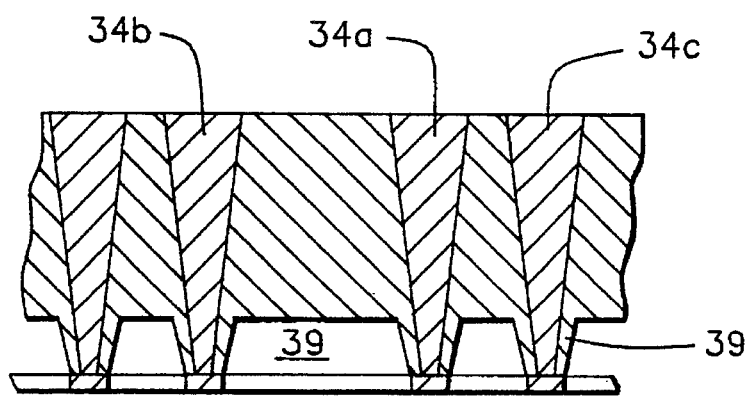

As shown in FIG. 6, the entire thickness of the anodized silicon wafer 12 is porous in areas which were exposed to the electrolytic solution. The back surface 14, and the areas 34a, 34b and 34c between the front surface 18 and the back surface which were masked remain non-porous and monocrystalline. However, since the pore formation process is isotropic, a slight amount of undercutting of the silicon nitride mask will take place, so that the non-porous monocrystalline areas 34a–34c are characterized by an increasing cross section as measured from the front surface to the back surface. If desired, monocrytalline areas 34a', 34b' and 34c' having a more uniform cross section axially may be obtained by masking the same pattern of silicon nitride portions 22' and 26'–28' on both surfaces of silicon wafer 12' and anodizing them simultaneously. An anodized wafer processed in this manner is illustrated in FIG. 7.

Figure 7:
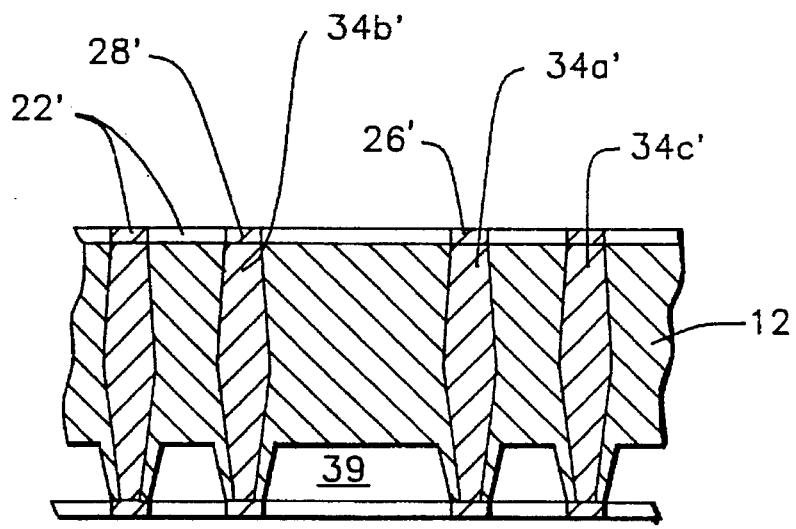
Figure 8:
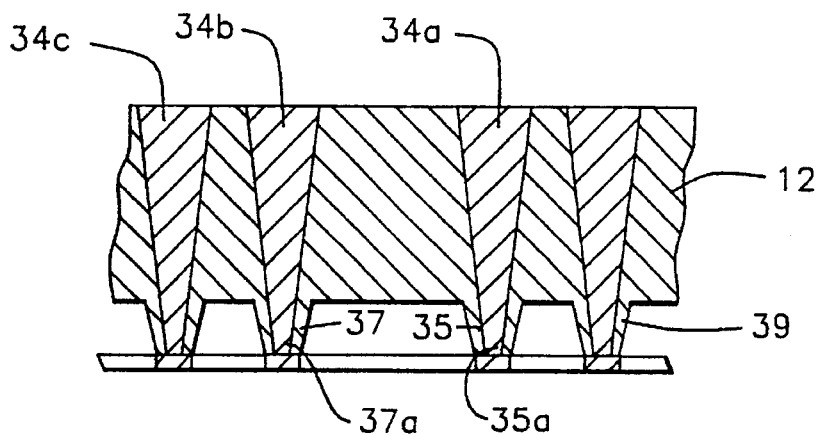

Once the cover wafer 10 has been anodized to create the configuration of porous and non-porous regions of silicon shown in FIG. 6 or 7, it is subjected to a thermal oxidization process. During the oxidation process all porous areas of silicon are converted to silicon dioxide while the silicon nitride masks the monocrystalline silicon areas from the oxidation. Processes which convert porous silicon to silicon dioxide are well known in the art. One such process is described in an article by C. Oules et al appearing in the Journal of the Electrochemical Society, Volume 139, No. 12 (1992). As disclosed in the Oules et al article, the oxidized regions of porous silicon can be densified by heating it in an oxygen ambient, thereby resulting in a continuous (i.e. non-porous) layer of silicon dioxide. A silicon dioxide wafer 12 having regions of monocrystalline p-type silicon 34a, 34b, and 34c obtained in the above described manner is shown in FIG. 8. The mask layer 20 is then removed using a suitable etchant, such as hot phosphoric acid in the case of a silicon nitride mask, which will not attack the silicon dioxide or silicon.

At this point, the front surface of cover wafer 10 may be bonded to a sensor wafer having circuit elements thereon. However, in order to facilitate ohmic contact with the electrical bond pads of the semiconductor device to which it will be bonded, a $p^+$ region is preferably formed on the crystalline contact surfaces 35a and 37a of projections 35 and 37, respectively, which will be placed in contact with the aforementioned bond pads. This may be accomplished using a well known thermal diffusion process in which boron is diffused into the front surface of the wafer. It will, of course, be appreciated that this diffusion process may be performed before or after the wafer 12 is oxidized.

As indicated earlier, the cover wafer 10 formed in accordance with the present invention may be used to hermetically seal and environmentally isolate circuit elements on any substrate surface. However, if the cover wafer is to be used for sealing IC's or any other device which cannot stand high temperature processing, the exposed surface of the rim and the contact regions should be coated with a suitable conductive material such as thin metal film, which can affect a seal at a low temperature to the rim and the contacts on the IC wafer. The sealing occurs by a melting process employing low melting point conductive layers. Eutectic bonds are also applicable. Moreover, the present invention permits the fabrication of such isolated circuits in an economically attractive manner. For illustrative purposes, the use of the inventive cover wafer is now applied to the construction of piezoresistive transducers.

As is well known, a semiconductor transducer typically employs one or more piezoresistive elements which are mounted or diffused in a bridge pattern of resistors on a thin diaphragm member. The diaphragm member, which may be fabricated from silicon, flexes upon application of force thereto and thereby causes fiber stresses on the top surface. These stresses elongate or shorten the piezoresistors and cause them to vary their resistance according to the deflection of the diaphragm. Reference may be had to U.S. Pat. No. 4,498,229 entitled PIEZORESISTIVE TRANSDUCER, issued on Feb. 12, 1985 to Leslie B. Wilner and to U.S. Pat. No. 4,672,354 entitled FABRICATION OF DIELECTRICALLY ISOLATED FINE LINE SEMICONDUCTOR TRANSDUCERS AND APPARATUS, issued on Jun. 9, 1987 to Anthony D. Kurtz et al., assigned to the assignee herein, as illustrative examples of piezoresistive transducer construction.

Figure 9:
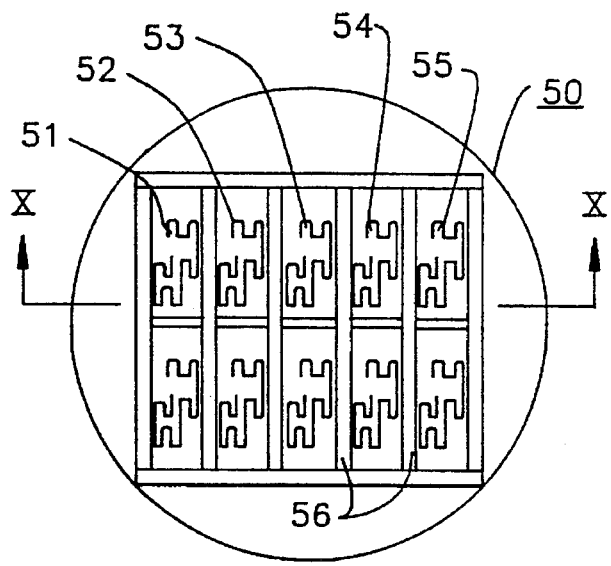
FIG. 9 is a top plan view of a plurality of diffused circuits to be hermetically sealed using the protective cover of the present invention.

With reference now to FIG. 9, there is shown a top view of a silicon wafer 50, incorporating on a surface thereof a plurality of individual bridge configurations 51, 52, 53, 54 and 55. While the top five bridge configurations have been referenced, an additional number are shown beneath. It is, of course, understood, that many more such configurations can be accommodated on a silicon wafer 50, strictly dependent upon wafer size and bridge dimensions. In any event, a plurality of piezoresistive bridge patterns can be conveniently formed on the wafer 50 of silicon using conventional semiconductor techniques. Each pattern is representative of a bridge configuration, by way of example, and contains four piezoresistive elements to form a typical Wheatstone bridge configuration. The wafer 50 is preferably monocrystalline and, in the illustrative embodiment, is doped with an n-type impurity. A grid-like pattern of projecting silicon line segments 56 alignable with the silicon rim portions 39 formed on the cover wafer 10 around each rectangular area 24 and of the same conductivity type (p-type in the illustrated embodiment) is also formed on the surface of wafer 50, with each bridge pattern being bounded on all sides by segments thereof. It will thus be apparent that each bridge pattern is alignable with, and is adapted to be received within, a corresponding trough or cavity 31 formed on the cover wafer. Similarly, it will be appreciated that a plurality of individual integrated circuits may be similarly arranged on a substrate and adapted to be received in the aforementioned cavity 31.

Figure 10:
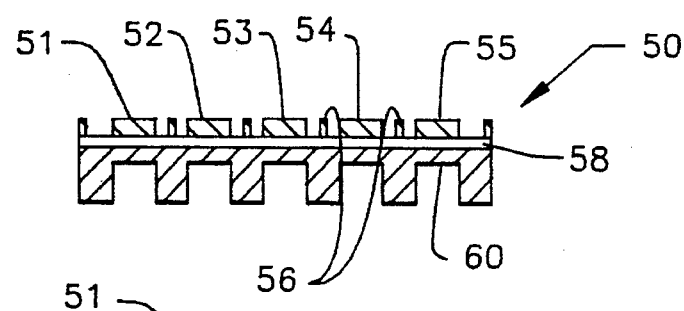
FIG. 10 is a cross sectional view taken across line X—X in FIG. 9.

FIG. 10 shows a cross sectional view taken through line X—X of FIG. 9 and the patterns are generally represented in FIG. 9 by numerals 51-55, which for clarity, are shown as rectangular configurations. As shown in FIG. 10, each of the piezoresistors included in each bridge pattern, such as 51, may be isolated from the silicon wafer or substrate 50 by means of a dielectric layer 58 between the sensing elements 51-55 and the silicon diaphragm 60. The construction of a dielectrically isolated silicon sensor chip such as the one illustrated in FIG. 10 is shown and described in the aforementioned U.S. Pat. No. 4,672,354, the disclosure of which is incorporated herein by reference. It is again emphasized that the novelty of the present invention does not lie in the precise construction of the semiconductor chip 50 and that a dielectrically isolated piezotransducer structure is utilized herein for purposes of illustration only.

Figure 11:
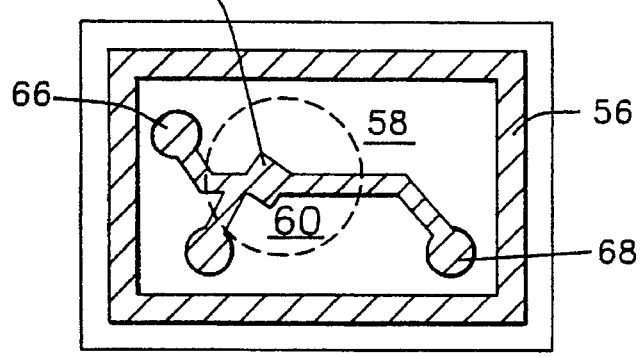
FIG. 11 is a top plan view showing an individual diffused circuit.
Figure 12:
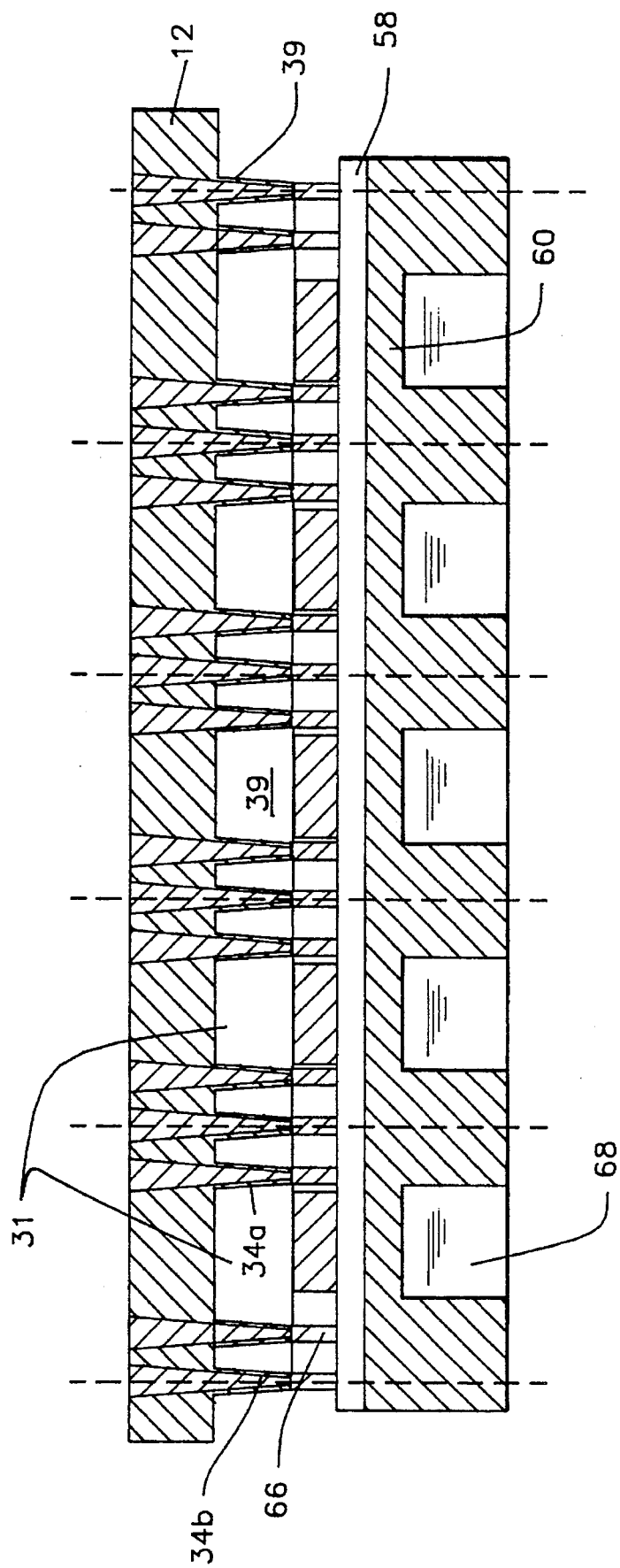
FIG. 12 is a cross sectional view depicting the fusion of the protective cover of the present invention to the wafer of FIGS. 9 and 10 in accordance with one exemplary use the novel cover wafer of the present invention.

With reference now to FIG. 11, it can be seen that each bridge pattern also includes silicon electrical bond pads 66 and 68 associated therewith, these being of the same conductivity type as the monocrystalline areas 34b and 34c of the cover wafer and alignable therewith (p-type in the illustrated embodiment). Using a conventional silicon fusion bonding process, the front surface of the cover wafer is bonded to the front of the sensor wafer as shown in FIG. 12. The raised p-type silicon areas on the wafer 50 are bonded to the p-type silicon areas of the cover wafer 10. As such, the silicon rim portions 39 and 56 form a hermetically sealed cavity area 31 in which the circuit elements aligned therewith are received, thereby isolating them from ambient conditions. The cover wafer should have a minimum thickness oxide layer on it to ensure a good rapid seal. Preferably, the two wafers are sealed briefly at low temperatures to prevent any unwanted diffusion processes from occurring. After the seal is formed, the structure is subjected to a short anneal to ensure that the contacts between the cover wafer and the sensors are ohmic. It is of course understood that fusion bonding is not suitable for sealing of IC wafers. For IC wafers sealing is accomplished at lower temperatures because of the low melting point conductive layers which were previously applied to the cover wafer. In IC's, the metal can be applied to either, or both wafers.

It should now be readily appreciated that the crystalline areas 34a, 34b and 34c of the cover wafer act as extended contacts for the sensing elements. These areas can be depressed relative to the rim to enable one to form solder terminal pads on the respective contact areas. This facilitates the mounting of the resultant chip on a circuit board or other substrate. The sensing elements themselves are well protected within sealed cavity 31. Pressure can now be applied to the diaphragm 60 on the back surface thereof, while the sensitive surface of the sensor chip 10 is completely protected from the outside environment.

The composite structure of FIG. 12 is now scribed, cut or otherwise separated along the dashed lines and along other lines (not shown) to separate the plurality of transducers or other circuits into individual circuit assemblies. Thus, a great number of hermetically sealed individual circuit devices are obtained via the above described common processing procedure.

What is claimed is:

1. A method of fabricating a semiconductor structure comprising the steps of:

providing a first semiconductor wafer having a semiconductor element located on a surface thereof;

providing a second semiconductor wafer including a conductive region extending between and connecting opposed surfaces thereof;

electrochemically etching said second semiconductor wafer for a period sufficient to form pores on an exposed surface thereof; and bonding said second semiconductor wafer to said first semiconductor wafer such that a contact surface of said conductive region is coupled to a conductive pad on said first wafer and such that a cavity defined therebetween encloses said semiconductor element, said semiconductor element being surrounded by at least one sidewall formed between said first and second semiconductor wafers.

2. A method according to claim 1, further including the steps of:

forming a mask pattern on a bottom surface of said second semiconductor wafer prior to said electrochemical etching step; and etching said second semiconductor wafer about said pattern to cause said pattern to project from said bottom surface, thereby forming at least a portion of said cavity.

3. A method according to claim 1, wherein said conductive region of said second semiconductor wafer is monocrystalline silicon having a given conductivity.

4. A method according to claim 3, wherein said conductive region of said second semiconductor wafer is n-type silicon.

5. A method according to claim 3, wherein said conductive region of said second semiconductor wafer is p-type silicon 6. A method according to claim 5, further including the step of diffusing boron into said contact surface to provide a $p^+$ region thereon.

7. A method according to claim 1, wherein said second semiconductor wafer is monocrystalline silicon prior to said electrochemical etching step and wherein said method further includes the step of thermally oxidizing the second semiconductor wafer after said electrochemical etching step to convert the areas of porous silicon into silicon dioxide.

8. A method according to claim 1, further including the step of illuminating said exposed surface of said second semiconductor wafer with ultraviolet (UV) light during said electrochemical etching step.

9. A method according to claim 2, wherein said method further includes removing said mask pattern to expose a rim portion alignable with a corresponding rim on said first wafer, wherein aligned rim portions define said at least one sidewall.

10. A method according to claim 9, wherein said contact surface is exposed during said removing step.

11. A method according to claim 9, wherein the rim portion of said second semiconductor wafer is fusion bonded to the rim of said first wafer to hermetically seal said cavity and wherein said contact surface is fusion bonded to said conductive pad during said bonding step.

12. A method according to claim 1, wherein said semiconductor element is an integrated circuit device.

* * * * *